United States Patent
Akihisa

(10) Patent No.: US 8,229,649 B2
(45) Date of Patent: Jul. 24, 2012

(54) SPARK IGNITION TYPE INTERNAL COMBUSTION ENGINE

(75) Inventor: Daisuke Akihisa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 350 days.

(21) Appl. No.: 12/673,298

(22) PCT Filed: Jun. 15, 2009

(86) PCT No.: PCT/JP2009/061254
§ 371 (c)(1),
(2), (4) Date: Feb. 12, 2010

(87) PCT Pub. No.: WO2010/146719
PCT Pub. Date: Dec. 23, 2010

(65) Prior Publication Data
US 2011/0094479 A1    Apr. 28, 2011

(51) Int. Cl.
*F02D 41/30*    (2006.01)
*F02B 75/04*    (2006.01)
*F01L 1/34*    (2006.01)
(52) U.S. Cl. .................. 701/103; 123/48 C; 123/90.15
(58) Field of Classification Search .......... 701/103–105, 701/110, 112; 123/48 R–48 C, 90.15–90.18, 123/90.23, 339.11, 339.19, 321, 322, 345–348, 123/478–480
See application file for complete search history.

(56) References Cited

U.S. PATENT DOCUMENTS

| 7,882,821 B2 * | 2/2011 | Akihisa et al. ............... 123/347 |
| 2009/0125211 A1 * | 5/2009 | Akihisa et al. ............... 701/103 |
| 2009/0187329 A1 * | 7/2009 | Akihisa et al. ............... 701/105 |
| 2011/0005496 A1 * | 1/2011 | Hiraya et al. ............... 123/48 B |

FOREIGN PATENT DOCUMENTS

| JP | A-2007-303423 | 11/2007 |
| JP | A-2008-38796 | 2/2008 |
| JP | A-2008-286149 | 11/2008 |
| JP | A-2008-303773 | 12/2008 |

OTHER PUBLICATIONS

International Search Report dated Aug. 11, 2009 in International Patent Application No. PCT/JP2009/061254 (with translation).

* cited by examiner

*Primary Examiner* — John T. Kwon
*Assistant Examiner* — Johnny Hoang
(74) *Attorney, Agent, or Firm* — Oliff & Berridge PLC

(57) ABSTRACT

In an internal combustion engine, a variable compression ratio mechanism (A) able to change a mechanical compression ratio and a variable valve timing mechanism (B) able to change a closing timing of an intake valve (7) are provided. When an amount of intake air supplied to a combustion chamber (5) is small, the closing timing of the intake valve (7) is held at a limit closing timing, and usually, when the amount of intake air supplied to the combustion chamber (5) increases by a certain extent, the action of advancing the closing timing of the intake valve (7) is started. As opposed to this, when the amount of intake air supplied to the combustion chamber (5) is small, if the rapid acceleration operation is performed, the action of advancing the closing timing of the intake valve (7) is started immediately.

4 Claims, 11 Drawing Sheets

Fig.2
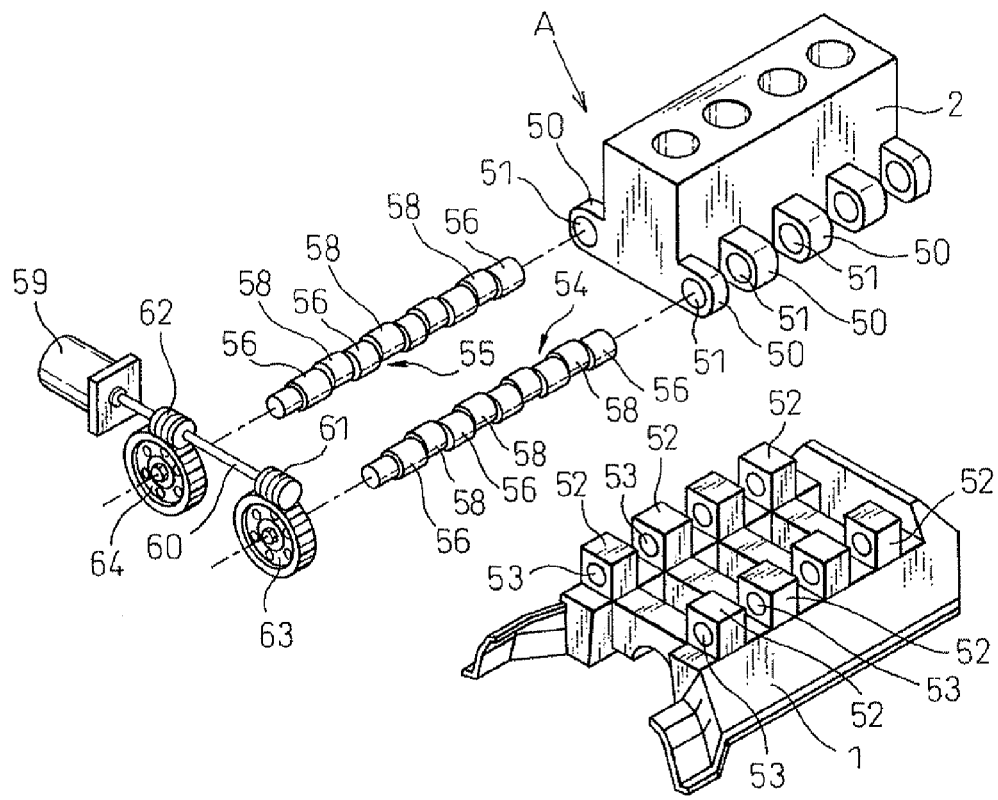
Fig.3
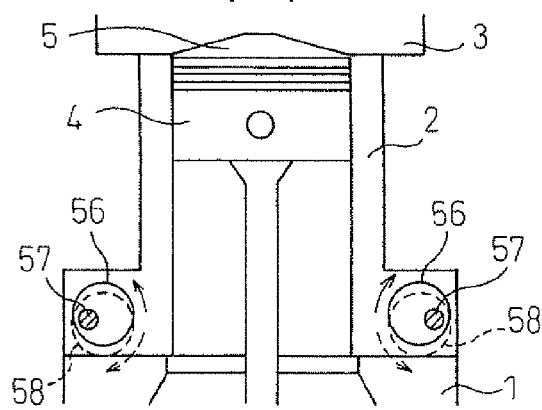
(A)
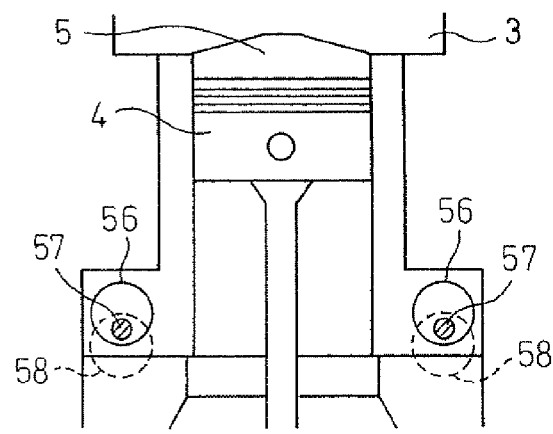
(B)

Fig.6
(A)
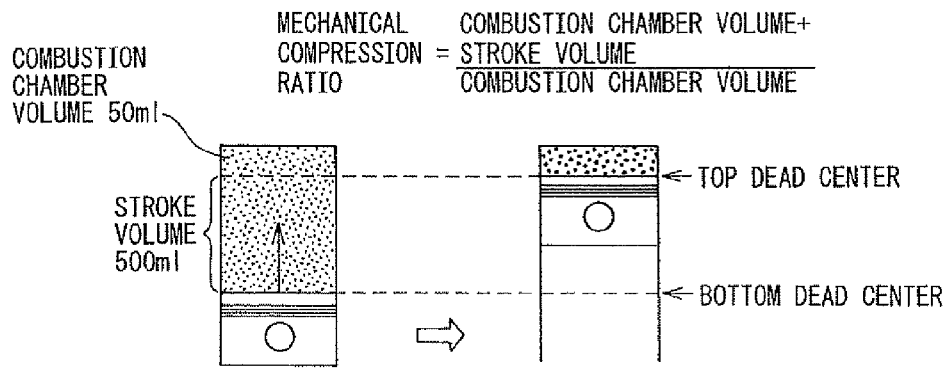
(B)
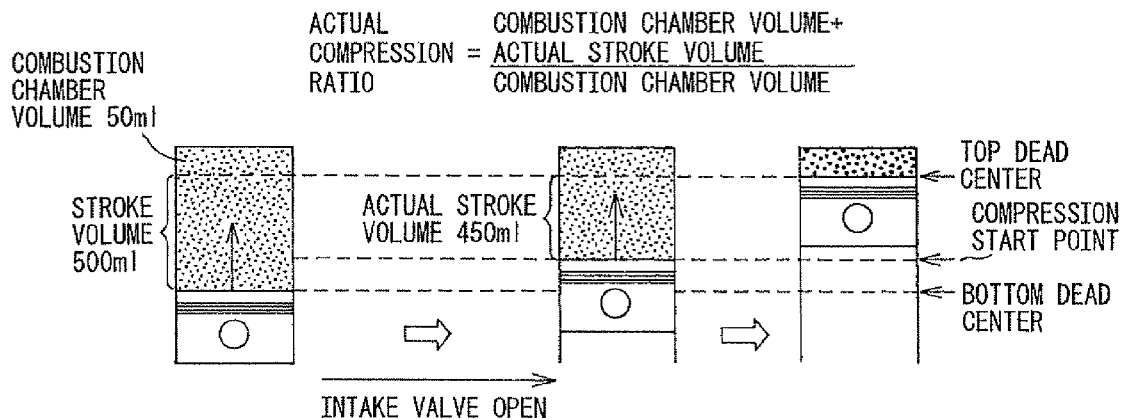
(C)
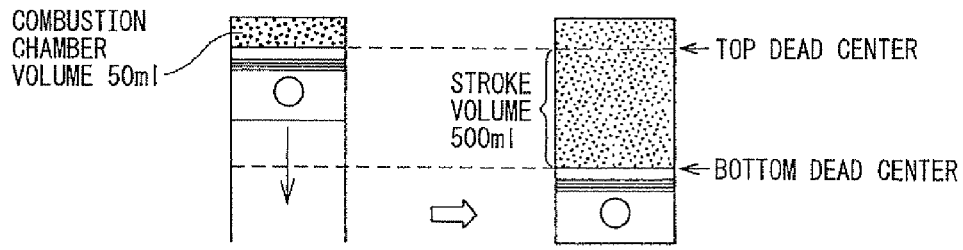

SPARK IGNITION TYPE INTERNAL COMBUSTION ENGINE

TECHNICAL FIELD

The present invention relates to a spark ignition type internal combustion engine.

BACKGROUND ART

Known in the art is a spark ignition type internal combustion engine provided with a variable compression ratio mechanism able to change a mechanical compression ratio and a variable valve timing mechanism able to control a closing timing of an intake valve, wherein an amount of intake air supplied to a combustion chamber is mainly controlled by changing the closing timing of the intake valve, the mechanical compression ratio is increased toward a maximum mechanical compression ratio as the amount of intake air supplied to the combustion chamber is reduced, the amount of intake air supplied to the combustion chamber is reduced as the closing timing of the intake valve is moved in a direction away from an intake bottom dead center toward a limit closing timing, when the closing timing of the intake valve reaches the limit closing timing, the amount of intake air supplied to the combustion chamber becomes a control limit intake air amount which is a control limit by the variable valve mechanism, and when the amount of intake air supplied to the combustion chamber is further reduced from the control limit intake air amount, a throttle valve is used to control the amount of intake air supplied to the combustion chamber, and, at this time, the closing timing of the intake valve is held at the limit closing timing (see Patent Literature 1).

In this internal combustion engine, if an acceleration operation is performed when the amount of intake air supplied to the combustion chamber is smaller than the control limit intake air amount, that is, when the amount of intake air supplied to the combustion chamber is controlled by the throttle valve, to obtain the best fuel consumption, regardless of the degree of acceleration, first, the throttle valve is opened toward full opening, next, when fully opening the throttle valve, the movement of the closing timing of the intake valve from the limit closing timing in a direction approaching the intake bottom dead center so as to increase the amount of intake air supplied to the combustion chamber is started.

CITATION LIST

Patent Literature

Patent Literature 1: Japanese Patent Publication (A) No. 2007-303423

SUMMARY OF INVENTION

Technical Problem

However, if, to obtain the best fuel consumption when rapid acceleration is required, first, the throttle valve is opened until fully opening, next, the closing timing of the intake valve is moved toward the intake bottom dead center, there is the problem that increasing the amount of intake air supplied to the combustion chamber will take time, that is, increasing the output torque of the engine will take time, and good acceleration will not be able to be obtained regardless of the fact that rapid acceleration is required.

An object of the present invention is to provide a spark ignition type internal combustion engine designed to give good acceleration when rapid acceleration is required.

Solution to Problem

According to the present invention, there is provided a spark ignition type internal combustion engine provided with a variable compression ratio mechanism able to change a mechanical compression ratio and a variable valve timing mechanism able to control a closing timing of an intake valve, wherein an amount of intake air supplied to a combustion chamber is mainly controlled by changing the closing timing of the intake valve, the mechanical compression ratio is increased toward a maximum mechanical compression ratio as the amount of intake air supplied to the combustion chamber is reduced, the amount of intake air supplied to the combustion chamber is reduced as the closing timing of the intake valve is moved in a direction away from an intake bottom dead center toward a limit closing timing, and, when the closing timing of the intake valve reaches the limit closing timing, the amount of intake air supplied to the combustion chamber becomes a control limit intake air amount which is a control limit by the variable valve mechanism, and when the amount of intake air supplied to the combustion chamber is further reduced from the control limit intake air amount, the closing timing of the intake valve is held at the limit closing timing, wherein, when an acceleration operation is performed when the amount of intake air supplied to the combustion chamber is smaller than the control limit intake air amount, if the required acceleration degree is higher than a predetermined degree, the movement of the closing timing of the intake valve from the limit closing timing in a direction approaching the intake bottom dead center is started when the amount of intake air supplied to the combustion chamber is smaller compared with when the required acceleration degree is lower than the predetermined degree.

ADVANTAGEOUS EFFECTS OF INVENTION

If the required acceleration degree is high, when the amount of intake air supplied to the combustion chamber is smaller compared to when the required acceleration degree is low, that is, at an early timing after there is a request for acceleration, the closing timing of the intake valve is changed toward the intake bottom dead center to start the action of increasing the amount of intake air supplied to the combustion chamber. As a result, the rise of the engine output torque becomes earlier and therefore a good acceleration commensurate with the request can be obtained.

BRIEF DESCRIPTION OF THE DRAWINGS

FIG. 2 is a disassembled perspective view of a variable compression ratio mechanism, FIGS. 3(A) and 3(B) are side cross-sectional views of an illustrated internal combustion engine, FIGS. 6(A), 6(B), and 6(C) are views for explaining the mechanical compression ratio, actual compression ratio, and expansion ratio.

MODE FOR CARRYING OUT THE INVENTION

Figure 1:
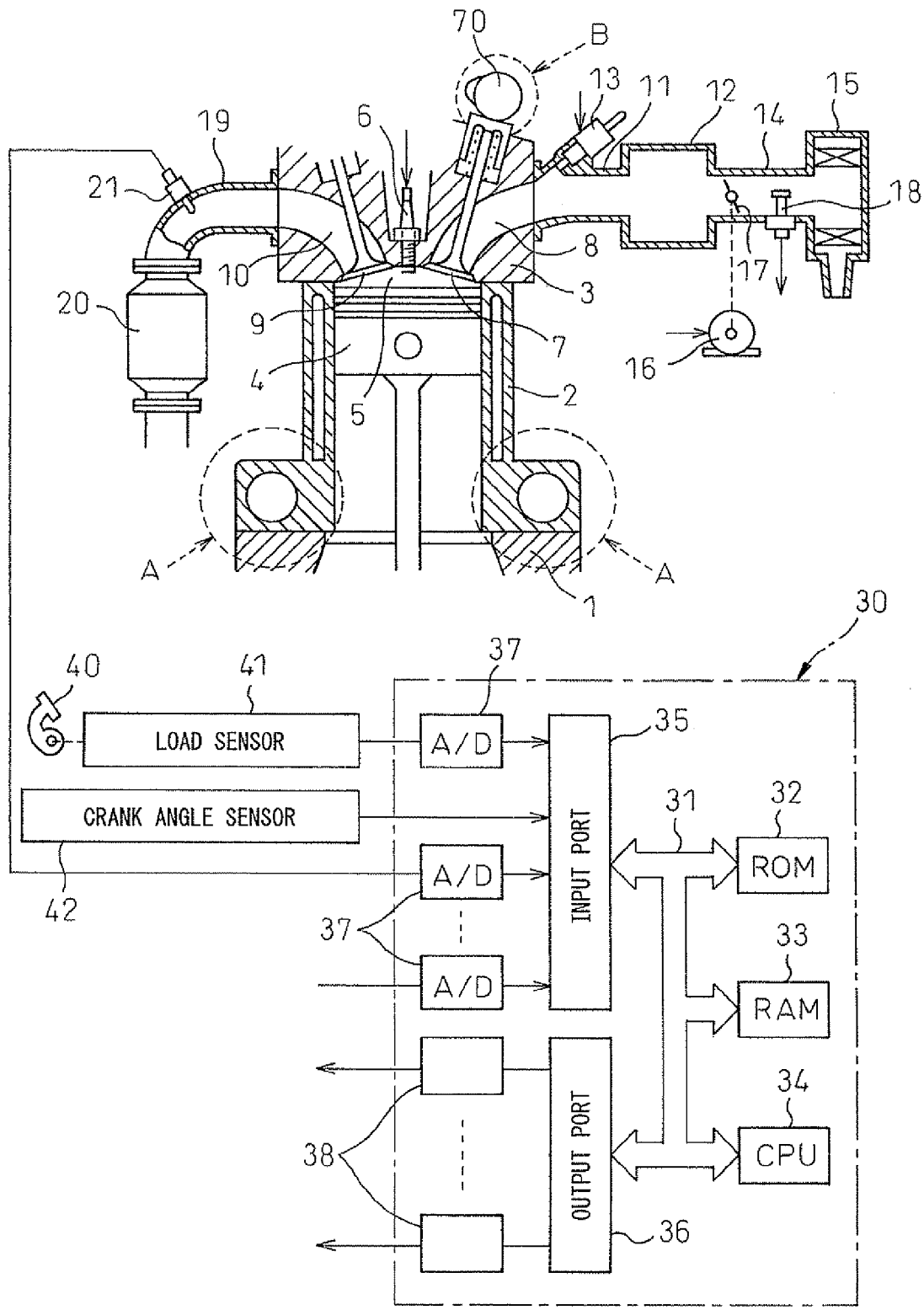
FIG. 1 is an overview of a spark ignition type internal combustion engine.

FIG. 1 shows a side cross-sectional view of a spark ignition type internal combustion engine.

Referring to FIG. 1, 1 indicates a crank case, 2 a cylinder block, 3 a cylinder head, 4 a piston, 5 a combustion chamber, 6 a spark plug arranged at the top center of the combustion chamber 5, 7 an intake valve, 8 an intake port, 9 an exhaust valve, and 10 an exhaust port. The intake port 8 is connected through an intake branch tube 11 to a surge tank 12, while each intake branch tube 11 is provided with a fuel injector 13 for injecting fuel toward a corresponding intake port 8. Note that each fuel injector 13 may be arranged at each combustion chamber 5 instead of being attached to each intake branch tube 11.

The surge tank 12 is connected through an intake duct 14 to an air cleaner 15, while the intake duct 14 is provided inside it with a throttle valve 17 driven by an actuator 16 and an intake air amount detector 18 using for example a hot wire. On the other hand, the exhaust port 10 is connected through an exhaust manifold 19 to a catalytic converter 20 housing for example a three-way catalyst, while the exhaust manifold 19 is provided inside it with an air-fuel ratio sensor 21.

On the other hand, in the embodiment shown in FIG. 1, the connecting part of the crank case 1 and the cylinder block 2 is provided with a variable compression ratio mechanism A able to change the relative positions of the crank case 1 and cylinder block 2 in the cylinder axial direction so as to change the volume of the combustion chamber 5 when the piston 4 is positioned at compression top dead center, and there is further provided with an actual compression action start timing changing mechanism B able to change a start timing of an actual compression action. Note that in the embodiment shown in FIG. 1, this actual compression action start timing changing mechanism B is comprised of a variable valve timing mechanism able to control the closing timing of the intake valve 7.

The electronic control unit 30 is comprised of a digital computer provided with components connected with each other through a bidirectional bus 31 such as a ROM (read only memory) 32, RAM (random access memory) 33, CPU (microprocessor) 34, input port 35, and output port 36. The output signal of the intake air amount detector 18 and the output signal of the air-fuel ratio sensor 21 are input through corresponding AD converters 37 to the input port 35. Further, the accelerator pedal 40 is connected to a load sensor 41 generating an output voltage proportional to the amount of depression L of the accelerator pedal 40. The output voltage of the load sensor 41 is input through a corresponding AD converter 37 to the input port 35. Further, the input port 35 is connected to a crank angle sensor 42 generating an output pulse every time the crankshaft rotates by for example 30°. On the other hand, the output port 36 is connected through the drive circuit 38 to a spark plug 6, fuel injector 13, throttle valve drive actuator 16, variable compression ratio mechanism A, and variable valve timing mechanism B.

FIG. 2 is a disassembled perspective view of the variable compression ratio mechanism A shown in FIG. 1, while FIG. 3 is a side cross-sectional view of the illustrated internal combustion engine. Referring to FIG. 2, at the bottom of the two side walls of the cylinder block 2, a plurality of projecting parts 50 separated from each other by a certain distance are formed. Each projecting part 50 is formed with a circular cross-section cam insertion hole 51. On the other hand, the top surface of the crank case 1 is formed with a plurality of projecting parts 52 separated from each other by a certain distance and fitting between the corresponding projecting parts 50. These projecting parts 52 are also formed with circular cross-section cam insertion holes 53.

As shown in FIG. 2, a pair of cam shafts 54, 55 is provided. Each of the cam shafts 54, 55 has circular cams 56 fixed on it able to be rotatably inserted in the cam insertion holes 51 at every other position. These circular cams 56 are coaxial with the axes of rotation of the cam shafts 54, 55. On the other hand, between the circular cams 56, as shown by the hatching in FIG. 3, extend eccentric shafts 57 arranged eccentrically with respect to the axes of rotation of the cam shafts 54, 55. Each eccentric shaft 57 has other circular cams 58 rotatably attached to it eccentrically. As shown in FIG. 2, these circular cams 58 are arranged between the circular cams 56. These circular cams 58 are rotatably inserted in the corresponding cam insertion holes 53.

When the circular cams 56 fastened to the cam shafts 54, 55 are rotated in opposite directions as shown by the solid line arrows in FIG. 3(A) from the state shown in FIG. 3(A), the eccentric shafts 57 move toward the bottom center, so the circular cams 58 rotate in the opposite directions from the circular cams 56 in the cam insertion holes 53 as shown by the broken line arrows in FIG. 3(A). As shown in FIG. 3(B), when the eccentric shafts 57 move toward the bottom center, the centers of the circular cams 58 move to below the eccentric shafts 57.

As will be understood from a comparison of FIG. 3(A) and FIG. 3(B), the relative positions of the crank case 1 and cylinder block 2 are determined by the distance between the centers of the circular cams 56 and the centers of the circular cams 58. The larger the distance between the centers of the circular cams 56 and the centers of the circular cams 58, the further the cylinder block 2 from the crank case 1. If the cylinder block 2 moves away from the crank case 1, the volume of the combustion chamber 5 when the piston 4 is positioned as compression top dead center increases, therefore by making the cam shafts 54, 55 rotate, the volume of the combustion chamber 5 when the piston 4 is positioned as compression top dead center can be changed.

As shown in FIG. 2, to make the cam shafts 54, 55 rotate in opposite directions, the shaft of a drive motor 59 is provided with a pair of worm gears 61, 62 with opposite thread directions. Gears 63, 64 engaging with these worm gears 61, 62 are fastened to ends of the cam shafts 54, 55. In this embodiment, the drive motor 59 may be driven to change the volume of the combustion chamber 5 when the piston 4 is positioned at compression top dead center over a broad range. Note that the variable compression ratio mechanism A shown from FIG. 1 to FIG. 3 shows an example. Any type of variable compression ratio mechanism may be used.

Figure 4:
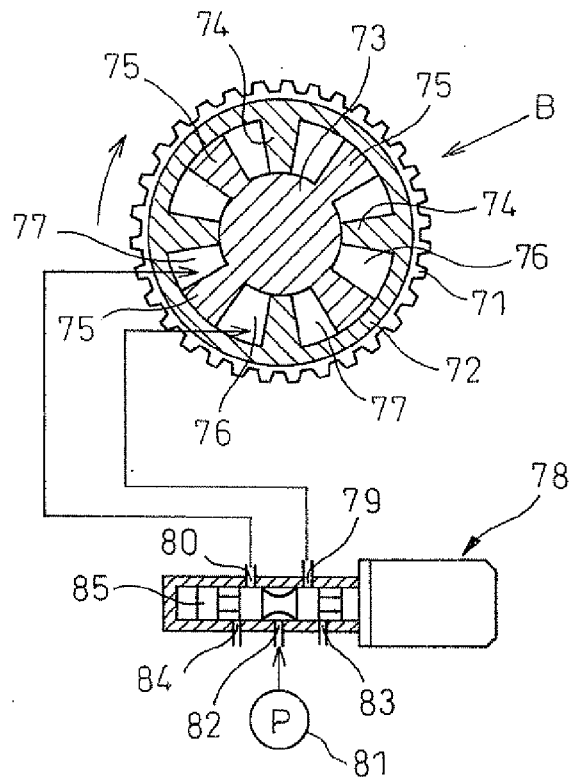
FIG. 4 is a view showing a variable valve timing mechanism.

On the other hand, FIG. 4 shows a variable valve timing mechanism B attached to the end of the cam shaft 70 for driving the intake valve 7 in FIG. 1. Referring to FIG. 4, this variable valve timing mechanism B is provided with a timing pulley 71 rotated by an engine crank shaft through a timing belt in the arrow direction, a cylindrical housing 72 rotating together with the timing pulley 71, a shaft 73 able to rotate together with an intake valve drive cam shaft 70 and rotate relative to the cylindrical housing 72, a plurality of partitions 74 extending from an inside circumference of the cylindrical housing 72 to an outside circumference of the shaft 73, and vanes 75 extending between the partitions 74 from the outside circumference of the shaft 73 to the inside circumference of the cylindrical housing 72, the two sides of the vanes 75 formed with hydraulic chambers for advancing 76 and use hydraulic chambers for retarding 77.

The feed of working oil to the hydraulic chambers 76, 77 is controlled by a working oil feed control valve 78. This working oil feed control valve 78 is provided with hydraulic ports 79, 80 connected to the hydraulic chambers 76, 77, a feed port 82 for working oil discharged from a hydraulic pump 81, a pair of drain ports 83, 84 and a spool valve 85 for controlling connection and disconnection of the ports 79, 80, 82, 83, 84.

To advance the phase of the cams of the intake valve drive cam shaft 70, in FIG. 4, the spool valve 85 is made to move to the right, working oil fed from the feed port 82 is fed through the hydraulic port 79 to the hydraulic chambers for advancing 76, and working oil in the hydraulic chambers for retarding 77 is drained from the drain port 84. At this time, the shaft 73 is made to rotate relative to the cylindrical housing 72 in the arrow direction.

As opposed to this, to retard the phase of the cams of the intake valve drive cam shaft 70, in FIG. 4, the spool valve 85 is made to move to the left, working oil fed from the feed port 82 is fed through the hydraulic port 80 to the hydraulic chambers for retarding 77, and working oil in the hydraulic chambers for advancing 76 is drained from the drain port 83. At this time, the shaft 73 is made to rotate relative to the cylindrical housing 72 in the direction opposite to the arrows.

When the shaft 73 is made to rotate relative to the cylindrical housing 72, if the spool valve 85 is returned to the neutral position shown in FIG. 4, the operation for relative rotation of the shaft 73 is ended, and the shaft 73 is held at the relative rotational position at that time. Therefore, it is possible to use the variable valve timing mechanism B so as to advance or retard the phase of the cams of the intake valve drive cam shaft 70 by exactly the desired amount.

Figure 5:
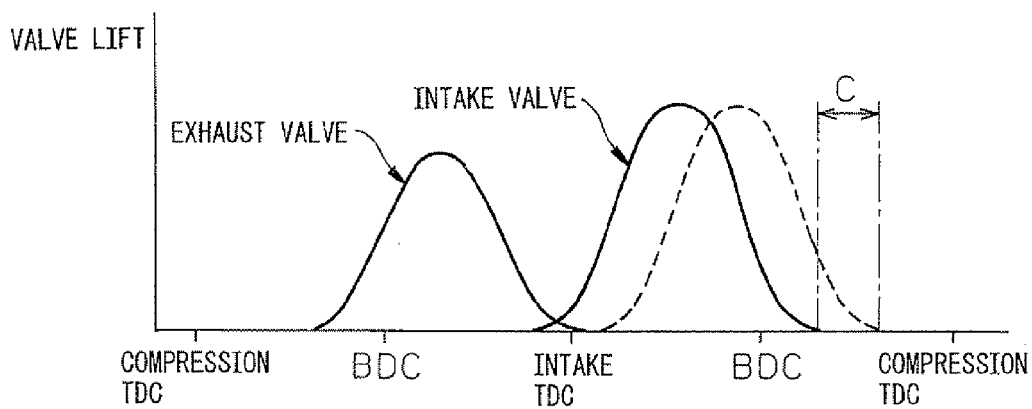
FIG. 5 is a view showing amounts of lift of the intake valve and exhaust valve.

In FIG. 5, the solid line shows when the variable valve timing mechanism B is used to advance the phase of the cams of the intake valve drive cam shaft 70 the most, while the broken line shows when it is used to retard the phase of the cams of the intake valve drive cam shaft 70 the most. Therefore, the opening time of the intake valve 7 can be freely set between the range shown by the solid line in FIG. 5 and the range shown by the broken line, therefore the closing timing of the intake valve 7 can be set to any crank angle in the range shown by the arrow C in FIG. 5.

The variable valve timing mechanism B shown in FIG. 1 and FIG. 4 is one example. For example, a variable valve timing mechanism or other various types of variable valve timing mechanisms able to change only the closing timing of the intake valve while maintaining the opening timing of the intake valve constant can be used.

Next, the meaning of the terms used in the present application will be explained with reference to FIG. 6. Note that FIGS. 6(A), (B), and (C) show for explanatory purposes an engine with a volume of the combustion chambers of 50 ml and a stroke volume of the piston of 500 ml. In these FIGS. 6(A), (B), and (C), the combustion chamber volume shows the volume of the combustion chamber when the piston is at compression top dead center.

FIG. 6(A) explains the mechanical compression ratio. The mechanical compression ratio is a value determined mechanically from the stroke volume of the piston and combustion chamber volume at the time of a compression stroke. This mechanical compression ratio is expressed by (combustion chamber volume+stroke volume)/combustion chamber volume. In the example shown in FIG. 6(A), this mechanical compression ratio becomes (50 ml+500 ml)/50 ml=11.

FIG. 6(B) explains the actual compression ratio. This actual compression ratio is a value determined from the actual stroke volume of the piston from when the compression action is actually started to when the piston reaches top dead center and the combustion chamber volume. This actual compression ratio is expressed by (combustion chamber volume+actual stroke volume)/combustion chamber volume. That is, as shown in FIG. 6(B), even if the piston starts to rise in the compression stroke, no compression action is performed while the intake valve is opened. The actual compression action is started after the intake valve closes. Therefore, the actual compression ratio is expressed as follows using the actual stroke volume. In the example shown in FIG. 6(B), the actual compression ratio becomes (50 ml+450 ml)/50 ml=10.

FIG. 6(C) explains the expansion ratio. The expansion ratio is a value determined from the stroke volume of the piston at the time of an expansion stroke and the combustion chamber volume. This expansion ratio is expressed by the (combustion chamber volume+stroke volume)/combustion chamber volume. In the example shown in FIG. 6(C), this expansion ratio becomes (50 ml+500 ml)/50 ml=11.

Next, the most basic features of the present invention will be explained with reference to FIG. 7 and FIG. 8. Note that FIG. 7 shows the relationship between the theoretical thermal efficiency and the expansion ratio, while FIG. 8 shows a comparison between the ordinary cycle and superhigh expansion ratio cycle used selectively in accordance with the load in the present invention.

FIG. 8(A) shows the ordinary cycle when the intake valve closes near the bottom dead center and the compression action by the piston is started from near substantially compression bottom dead center. In the example shown in this FIG. 8(A) as well, in the same way as the examples shown in FIGS. 6(A), (B), and (C), the combustion chamber volume is made 50 ml, and the stroke volume of the piston is made 500 ml. As will be understood from FIG. 8(A), in an ordinary cycle, the mechanical compression ratio is (50 ml+500 ml)/50 ml=11, the actual compression ratio is also about 11, and the expansion ratio also becomes (50 ml+500 ml)/50 ml=11. That is, in an ordinary internal combustion engine, the mechanical compression ratio and actual compression ratio and the expansion ratio become substantially equal.

Figure 7:
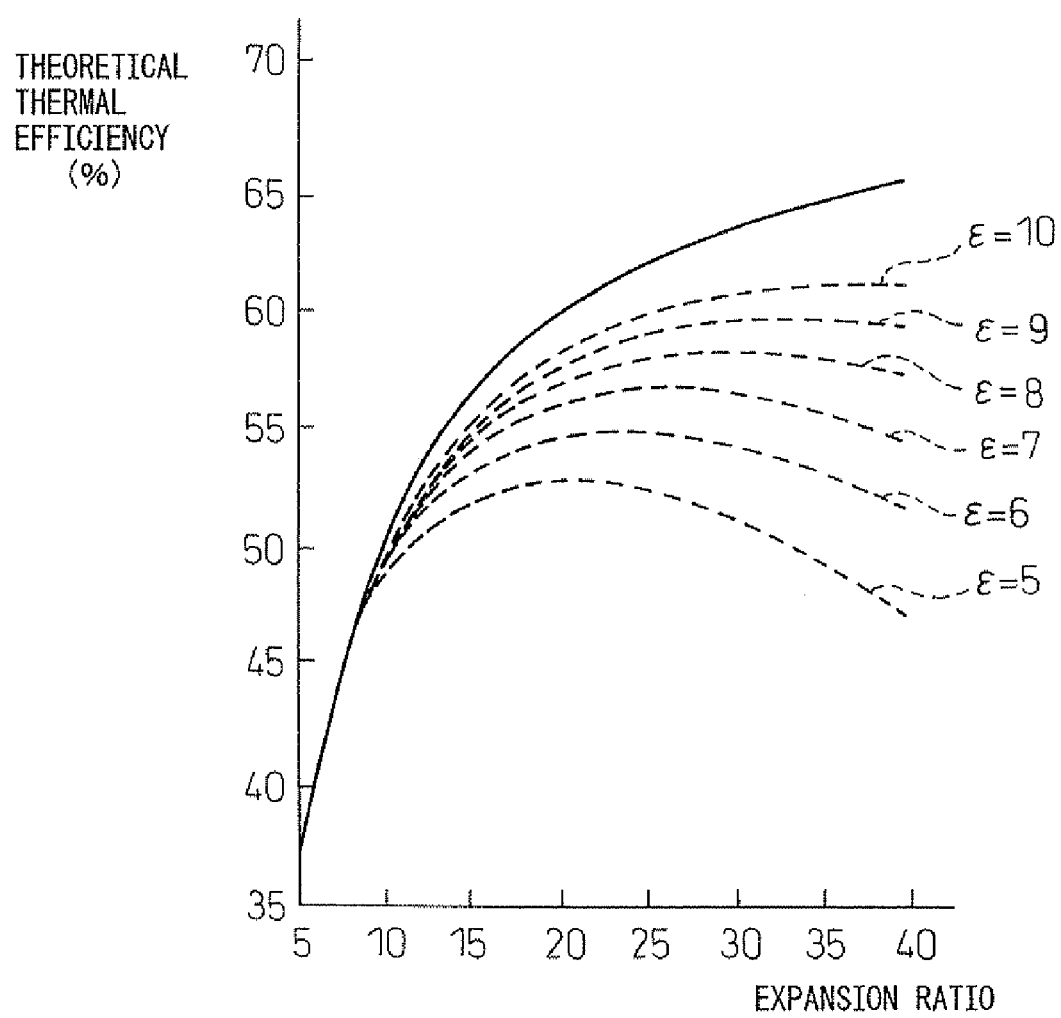
FIG. 7 is a view showing the relationship between a theoretical thermal efficiency and the expansion ratio.
Figure 8:
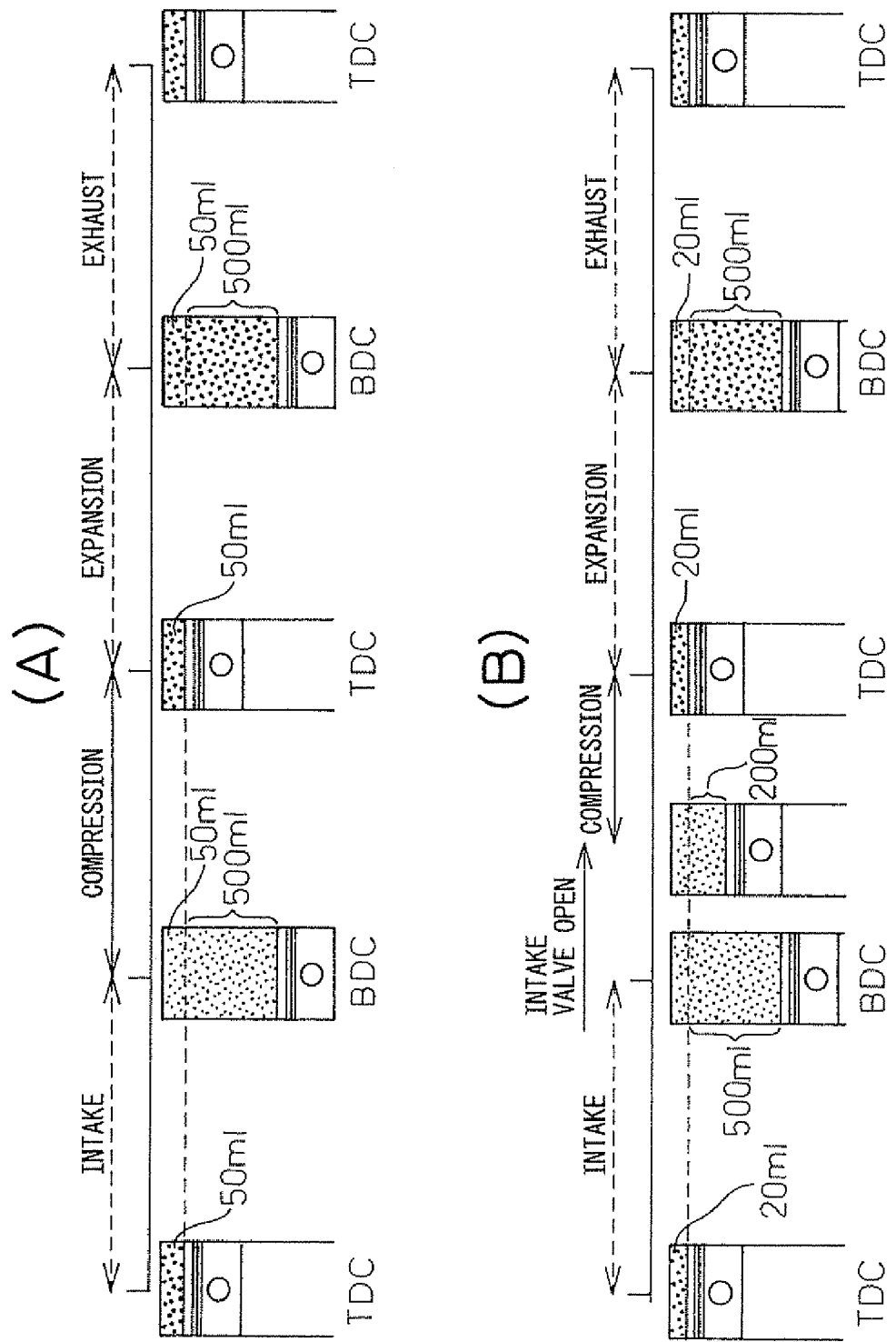
FIGS. 8(A) and 8(B) are views for explaining a normal cycle and superhigh expansion ratio cycle.

The solid line in FIG. 7 shows the change in the theoretical thermal efficiency in the case where the actual compression ratio and expansion ratio are substantially equal, that is, in the ordinary cycle. In this case, it is learned that the larger the expansion ratio, that is, the higher the actual compression ratio, the higher the theoretical thermal efficiency. Therefore, in an ordinary cycle, to raise the theoretical thermal efficiency, the actual compression ratio should be made higher. However, due to the restrictions on the occurrence of knocking at the time of engine high load operation, the actual compression ratio can only be raised even at the maximum to about 12, accordingly, in an ordinary cycle, the theoretical thermal efficiency cannot be made sufficiently high.

On the other hand, under this situation, the inventors strictly differentiated between the mechanical compression ratio and actual compression ratio and studied the theoretical thermal efficiency and as a result discovered that in the theoretical thermal efficiency, the expansion ratio is dominant, and the theoretical thermal efficiency is not affected much at all by the actual compression ratio. That is, if raising the actual compression ratio, the explosive force rises, but compression requires a large energy, accordingly even if raising the actual compression ratio, the theoretical thermal efficiency will not rise much at all.

As opposed to this, if increasing the expansion ratio, the longer the period during which a force acts pressing down the piston at the time of the expansion stroke, the longer the time that the piston gives a rotational force to the crankshaft. Therefore, the larger the expansion ratio is made, the higher the theoretical thermal efficiency becomes. The broken line $\epsilon=10$ in FIG. 7 shows the theoretical thermal efficiency in the case of fixing the actual compression ratio at 10 and raising the expansion ratio in that state. In this way, it is learned that the amount of rise of the theoretical thermal efficiency when raising the expansion ratio in the state where the actual compression ratio is maintained at a low value and the amount of rise of the theoretical thermal efficiency in the case where the actual compression ratio is increased along with the expansion ratio as shown by the solid line of FIG. 7 will not differ that much.

If the actual compression ratio is maintained at a low value in this way, knocking will not occur, therefore if raising the expansion ratio in the state where the actual compression ratio is maintained at a low value, the occurrence of knocking can be prevented and the theoretical thermal efficiency can be greatly raised. FIG. 8(B) shows an example of the case when using the variable compression ratio mechanism A and variable valve timing mechanism B to maintain the actual compression ratio at a low value and raise the expansion ratio.

Referring to FIG. 8(B), in this example, the variable compression ratio mechanism A is used to lower the combustion chamber volume from 50 ml to 20 ml. On the other hand, the variable valve timing mechanism B is used to delay the closing timing of the intake valve until the actual stroke volume of the piston changes from 500 ml to 200 ml. As a result, in this example, the actual compression ratio becomes (20 ml+200 ml)/20 ml=11 and the expansion ratio becomes (20 ml+500 ml)/20 ml=26. In the ordinary cycle shown in FIG. 8(A), as explained above, the actual compression ratio is about 11 and the expansion ratio is 11. Compared with this case, in the case shown in FIG. 8(B), it is learned that only the expansion ratio is raised to 26. This is the reason that it is called the "superhigh expansion ratio cycle".

As explained above, generally speaking, in an internal combustion engine, the lower the engine load, the worse the thermal efficiency, therefore to improve the thermal efficiency at the time of vehicle operation, that is, to improve the fuel consumption, it becomes necessary to improve the thermal efficiency at the time of engine low load operation. On the other hand, in the superhigh expansion ratio cycle shown in FIG. 8(B), the actual stroke volume of the piston at the time of the compression stroke is made smaller, so the amount of intake air which can be sucked into the combustion chamber 5 becomes smaller, therefore this superhigh expansion ratio cycle can only be employed when the engine load is relatively low. Therefore, in the present invention, at the time of engine low load operation, the superhigh expansion ratio cycle shown in FIG. 8(B) is set, while at the time of engine high load operation, the ordinary cycle shown in FIG. 8(A) is set. This is the basic feature of the present invention.

Next, the operational control as a whole will be explained with reference to FIG. 9.

Figure 9:
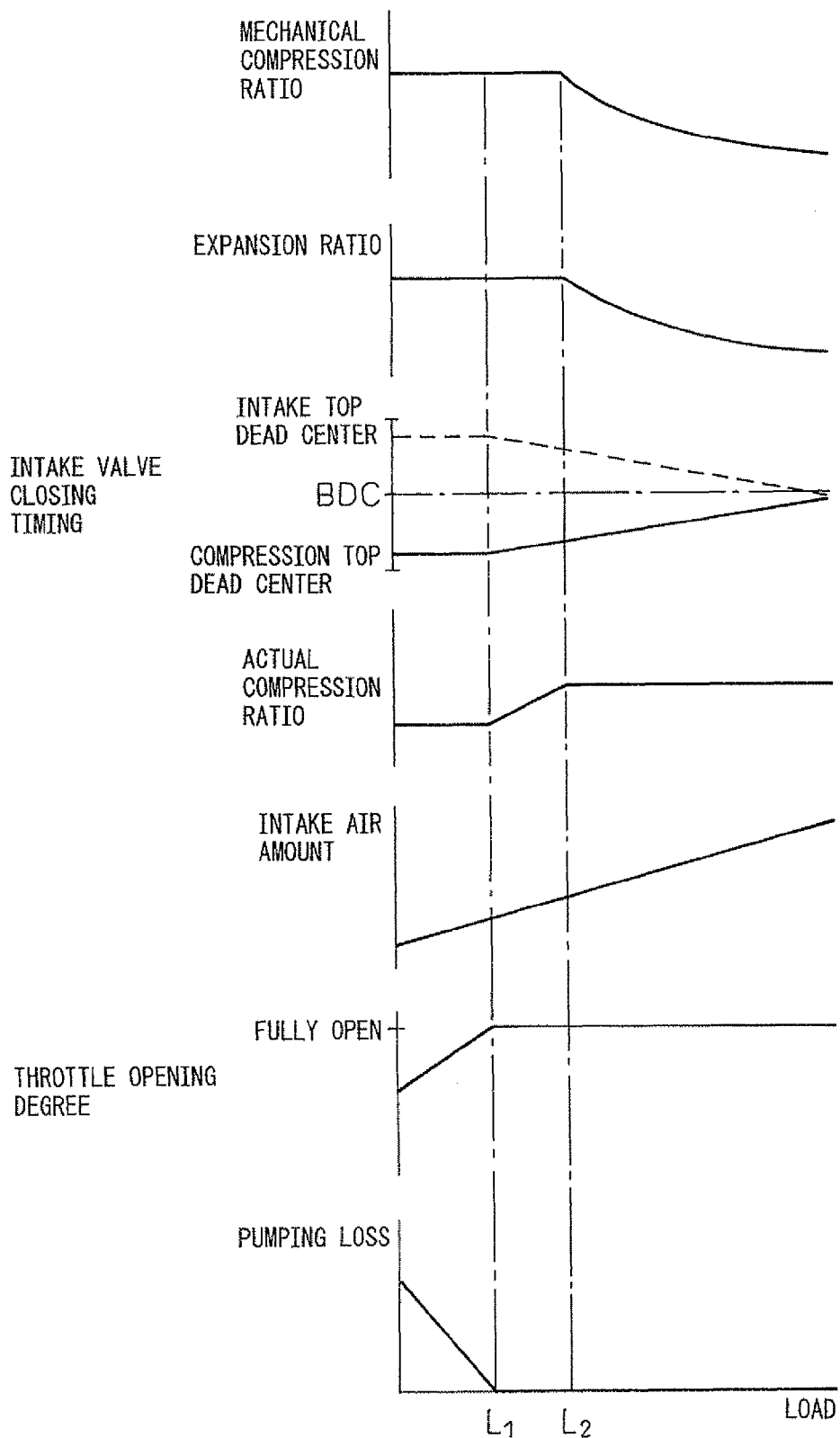
FIG. 9 is a view showing the changes in the mechanical compression ratio etc. in accordance with the engine load.

FIG. 9 shows the changes in the mechanical compression ratio, expansion ratio, closing timing of the intake valve 7, actual compression ratio, the amount of intake air, opening degree of the throttle valve 17, and pumping loss along with the engine load under a certain engine speed. Note that in the embodiment according to the present invention, ordinarily the average air-fuel ratio in the combustion chamber 5 is feedback controlled to the stoichiometric air-fuel ratio based on the output signal of the air-fuel ratio sensor 21 so that the three-way catalyst in the catalytic converter 20 can simultaneously reduce the unburned HC, CO, and $NO_x$ in the exhaust gas.

Now, as explained above, at the time of engine high load operation, the ordinary cycle shown in FIG. 8(A) is executed. Therefore, as shown in FIG. 9, at this time, since the mechanical compression ratio is made low, the expansion ratio becomes low. As shown by the solid line in low in FIG. 9, the closing timing of the intake valve 7 is advanced as shown by the solid line in FIG. 5. Further, at this time, the amount of intake air is large. At this time, the opening degree of the throttle valve 17 is maintained fully opened or substantially fully opened, so the pumping loss becomes zero.

On the other hand, as shown by the solid line in FIG. 9, if the engine load becomes low, the closing timing of the intake valve 7 is retarded and the amount of intake air supplied to the combustion chamber 5 is reduced. Further, at this time, the mechanical compression ratio is increased as the engine load becomes lower as shown in FIG. 9 so that the actual compression ratio is held substantially constant. Therefore, as the engine load becomes lower, the expansion ratio is also increased. Note that, at this time as well, the throttle valve 17 is held in the fully open or the substantially fully open state. Therefore, the amount of intake air supplied to the combustion chamber 5 is controlled without regard to the throttle valve 17 by changing the closing timing of the intake valve 7. At this time as well, the pumping loss becomes zero.

In this way, when the engine load falls from the engine high load operation state, the mechanical compression ratio is increased as the amount of intake air supplied to the combustion chamber 5 is reduced under a substantially constant actual compression ratio. That is, the volume of the combustion chamber 5 when the piston 4 reaches compression top dead center is reduced in proportion to the reduction in the amount of intake air supplied to the combustion Chamber 5. Therefore, the volume of the combustion chamber 5 when the piston 4 reaches compression top dead center changes in proportion to the amount of intake air supplied to the combustion chamber 5. Note that, at this time, in the example shown in FIG. 9, the air-fuel ratio in the combustion chamber 5 becomes the stoichiometric air-fuel ratio, so the volume of the combustion chamber 5 when the piston 4 reaches compression top dead center changes in proportion to the amount of fuel.

When the engine load falls further, the mechanical compression ratio is further increased. If the engine load falls to a medium load $L_2$ somewhat close to low load, the mechanical compression ratio reaches the maximum mechanical compression ratio forming the structural limit of the combustion chamber 5. When the mechanical compression ratio reaches the maximum mechanical compression ratio, in the region where the load is lower than the engine load $L_2$ when the mechanical compression ratio reaches the maximum mechanical compression ratio, the mechanical compression ratio is held at the maximum mechanical compression ratio. Therefore, at the time of engine medium load operation at the low load side and at the time of engine low load operation, that is, at the engine low load operation side, the mechanical compression ratio becomes the maximum and the expansion ratio also becomes the maximum. In other words, at the engine low load operation side, the mechanical compression ratio is made the maximum so that the maximum expansion ratio is obtained.

On the other hand, in the embodiment shown in FIG. 9, even if the engine load becomes lower than $L_2$, as shown by the solid line in FIG. 9, the closing timing of the intake valve 7 is retarded as the engine load becomes lower. When the engine load falls to $L_1$, the closing timing of the intake valve 7 becomes the limit closing timing able to control the amount of intake air supplied to the combustion chamber 5. When the closing timing of the intake valve 7 reaches the limit closing timing, in a region where the load is lower than the engine load $L_1$ when the closing timing of the intake valve 7 reaches the limit closing timing, the closing timing of the intake valve 7 is held at the limit closing timing.

If the closing timing of the intake valve 7 is held at the limit closing timing, the amount of intake air cannot be controlled any longer by change of the closing timing of the intake valve 7. In the embodiment shown in FIG. 9, at this time, that is, in the region where the load is lower than the engine load $L_1$ when the closing timing of the intake valve 7 reaches the limit closing timing, the throttle valve 17 is used to control the amount of intake air supplied to the combustion chamber 5. However, if performing control of the amount of intake air supplied to the combustion chamber 5 by the throttle valve 17, as shown in FIG. 9, the pumping loss is increased.

On the other hand, as shown in FIG. 9, at the engine high load operation side where the engine load is higher than $L_2$, the actual compression ratio is maintained at substantially the same actual compression ratio with respect to a same engine speed. As opposed to this, when the engine load is lower than $L_2$, that is, when the mechanical compression ratio is held at the limit mechanical compression ratio, the actual compression ratio is determined by the closing timing of the intake valve 7. If the closing timing of the intake valve 7 is retarded so that the engine load becomes between $L_1$ and $L_2$, the actual compression ratio falls. If the closing timing of the intake valve 7 is held at the limit closing timing so that the engine load is in the operating region lower than $L_1$, the actual compression ratio is maintained constant.

In this regard, as explained above, in the superhigh expansion ratio cycle shown in FIG. 8(B), the expansion ratio is made 26. The higher this expansion ratio, the better, but as will be understood from FIG. 7, if 20 or more with respect to the practically feasible lower limit actual compression ratio $\epsilon=5$, a considerably high theoretical heat efficiency can be obtained. Therefore, in the present invention, the variable compression ratio mechanism A is formed so that the expansion ratio becomes 20 or more.

On the other hand, as shown by the broken line in FIG. 9, the amount of intake air supplied to the combustion chamber 5 can be controlled without regard to the throttle valve 17 even by advancing the closing timing of the intake valve 7 as the engine load becomes lower. Therefore, if expressing the invention so as to include both the case shown by the solid line and the case shown by the broken line in FIG. 9, in the embodiment according to the present invention, the closing timing of the intake valve 7 is moved in a direction away from the intake bottom dead center BDC until the limit closing timing $L_1$ able to control the amount of intake air supplied to the combustion chamber 5 as the engine load becomes lower.

Figure 10:
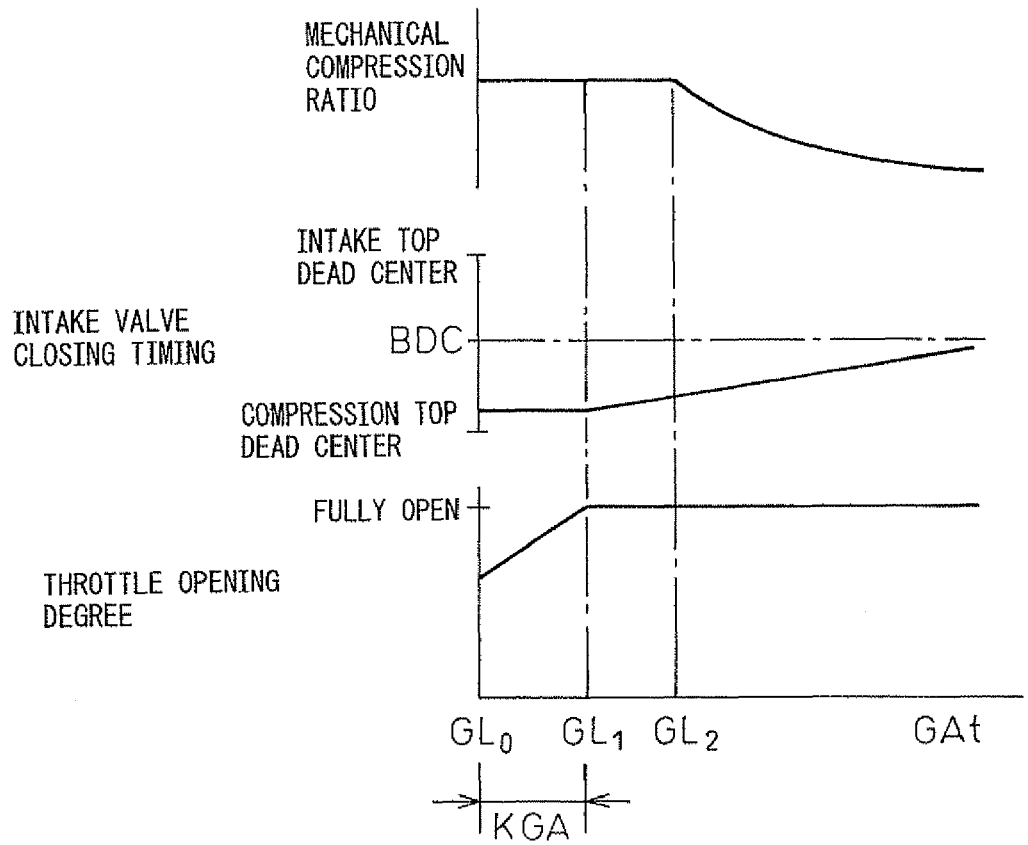
FIG. 10 is a view showing the changes in the mechanical compression ratio etc. in accordance with the target value GAt of the amount of intake air supplied to the combustion chamber.

Now, in the embodiment according to the present invention, the mechanical compression ratio, the closing timing of the intake valve 7, and the opening degree of the throttle valve 17 are controlled so that the amount of intake air supplied to the combustion chamber 5 becomes a target value (hereinafter, the "target intake air amount") GAt in accordance with the operating state of the engine. FIG. 10 shows the changes in the mechanical compression ratio, the closing timing of the intake valve 7, and the opening degree of the throttle valve 17 with respect to the target intake air amount GAt when the amount of intake air supplied to the combustion chamber 5 becomes the target intake air amount QAt. Note that, the $GL_1$ and $GL_2$ on the abscissa of FIG. 10 correspond to the $L_1$ and $L_2$ on the abscissa of FIG. 9. Further, in the example shown in FIG. 10, the closing timing of the intake valve 7 is advanced along with an increase in the target intake air amount GAt, that is, is moved in a direction approaching the intake bottom dead center BDC. The relationship shown in FIG. 10 is stored in advance in the ROM 32. The mechanical compression ratio, the closing timing of the intake valve 7, and the opening degree of the throttle valve 17 are usually controlled in accordance with the relationship shown in FIG. 10 in accordance with the changes in the target intake air amount GAt.

That is, as will be understood from FIG. 10, in the embodiment according to the present invention, the amount of intake air supplied to the combustion chamber 5 is mainly controlled by changing the closing timing of the intake valve 7. As the amount of intake air supplied to the combustion chamber 5 is reduced, the mechanical compression ratio is increased toward the maximum mechanical compression ratio, the amount of intake air supplied to the combustion chamber 5 is reduced as the closing timing of the intake valve 7 is moved in a direction away from the intake bottom dead center toward the limit closing timing $GL_1$, when the closing timing of the intake valve 7 reaches the limit closing timing, the amount of intake air supplied to the combustion chamber 5 becomes the control limit intake air amount $GL_1$ which is the control limit by the variable valve mechanism B, and, when the amount of intake air supplied to the combustion chamber 5 is reduced further from the control limit intake air amount $GL_1$, the closing timing of the intake valve 7 is held at the limit closing timing.

Furthermore, in the embodiment according to the present invention, if the amount of intake air supplied to the combustion chamber 5 becomes less than the control limit intake air amount $GL_1$, the opening degree of the throttle valve 17 is reduced as the amount of intake air supplied to the combustion chamber 5 becomes smaller. That is, when the amount of intake air supplied to the combustion chamber 5 is smaller than the control limit intake air amount $GL_1$, the amount of intake air supplied to the combustion chamber 5 is controlled by the throttle valve 17. Further, as will be understood from FIG. 10, if the amount of intake air supplied to the combustion chamber 5 is reduced and reaches $GL_2$, the mechanical compression ratio becomes maximum, while if the amount of intake air supplied to the combustion chamber 5 becomes smaller than $GL_2$, the mechanical compression ratio is maintained at the maximum mechanical compression ratio.

Figure 11:
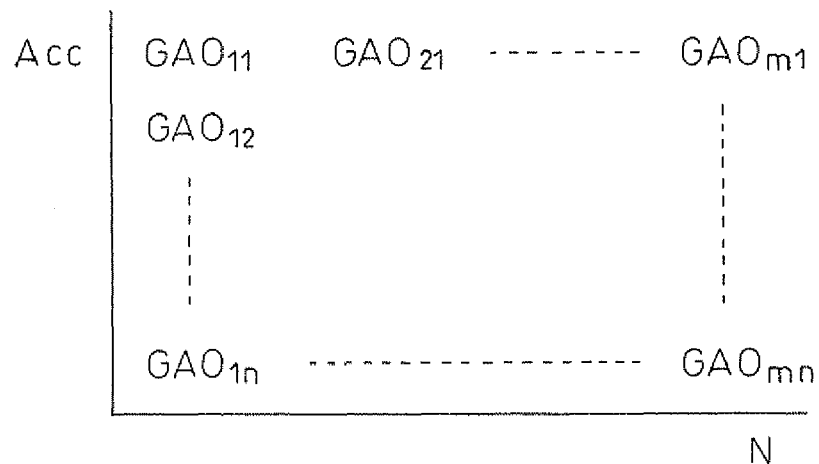
FIG. 11 is a view showing a map of the required value of the amount of intake air GAO supplied to the combustion chamber.

The required value of the amount of intake air supplied to the combustion chamber 5 at the time of vehicle operation (hereinafter referred to as the "required intake air amount") GAO is stored as a function of the amount of depression Acc of the accelerator pedal 40 and the engine speed N in the form of a map as shown in FIG. 11 in advance in the ROM 32. Usually, this required intake air amount GAO is made the target intake air amount GAt. Therefore, usually, the closing timing of the intake valve 7 etc. are changed in accordance with the required intake air amount GAO as shown in FIG. 10.

However, change of the mechanical compression ratio, change of the closing timing of the intake valve 7, and change of the opening degree of the throttle valve 17 take time. Therefore, there is a limit to the speed of change of the mechanical compression ratio, change of the closing timing of the intake valve 7, and change of the opening degree of the throttle valve 17, that is, the speed by which the target intake air amount GAt can be changed. Therefore, in the embodiment according to the present invention, when the required intake air amount GAO rapidly changes, the target intake air amount GAt is changed by the speed by which the mechanical compression ratio, the closing timing of the intake valve 7, and the opening degree of the throttle valve 17 can be changed. Next, this fact will be explained with reference to FIG. 12.

Figure 12:
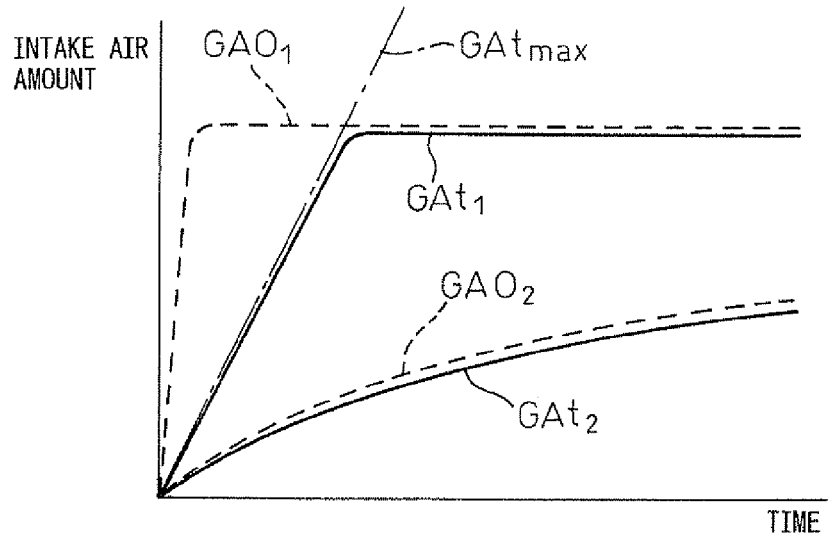
FIG. 12 is a view showing the required values GAO and $GAO_2$ and the target values $GAt_1$ and $GAt_2$ of the amount of intake air supplied to the combustion chamber.

FIG. 12 shows the changes along with time of the required intake air amount GAO and the target intake air amount GAt when an acceleration operation is performed. Note that, in FIG. 12, the dash-dot line GAtmax shows the maximum allowable speed of change of the target intake air amount GAt enabling change of the mechanical compression ratio, the closing timing of the intake valve 7, and the opening degree of the throttle valve 17. As shown in FIG. 12, in the embodiment according to the present invention, when the acceleration degree is low, that is, when, as shown by the broken line $GAO_2$, the speed of change of the required intake air amount GAO is lower than the maximum allowable speed of change GAtmax, the target intake air-fuel ratio GAt, as shown by the solid line $GAt_2$, is changed tracking changes in the required intake air amount GAO.

As opposed to this, when the acceleration degree is high, that is, as shown by the broken line $GAO_1$, when the speed of change of the required intake air amount GAO is larger than the maximum allowable speed of change AGtmax, as shown by the solid line $GAt_1$, the target intake air amount GAt is changed by the maximum allowable speed of change AGtmax. At this time, the mechanical compression ratio, the closing timing of the intake valve 7, and the opening degree of the throttle valve 17 are controlled based on the changes in the target intake air amount GAt. Note that, in the embodiment according to the present invention, this maximum allowable speed of change AGtmax is made the constant value, but this AGtmax may also be changed in accordance with the amount of depression Acc of the accelerator pedal 40 and the engine speed N.

Now, if controlling the mechanical compression ratio, the closing timing of the intake valve 7, and the opening degree of the throttle valve 17 in accordance with the relationship shown in FIG. 10 in accordance with the target intake air amount GAt, the thermal efficiency becomes the highest and, therefore, the best fuel consumption is obtained. Therefore, in the embodiment according to the present invention, usually the mechanical compression ratio, the closing timing of the intake valve 7, and the opening degree of the throttle valve 17 are controlled in accordance with the relationship shown in FIG. 10 in accordance with the change of the target intake air amount GAt.

Therefore, as will be understood from FIG. 10, for example, if an acceleration operation is performed when the target intake air amount GAt is smaller than the control limit intake air amount $GL_1$, first the throttle valve 17 is opened toward full opening. Next, if the throttle valve 17 opens, the action of advancing the closing timing of the intake valve 7 is started. When the required acceleration degree is low, there is no problem even if controlling the mechanical compression ratio, the closing timing of the intake valve 7, and the opening degree of the throttle valve 17 in accordance with the relationship shown in FIG. 10.

However, when rapid acceleration is required, to obtain the best fuel consumption, if first opening the throttle valve 17 to full opening in accordance with the relationship shown in FIG. 10, next, starting the action of advancing the closing timing of the intake valve 7, increasing the amount of intake air supplied to the combustion chamber 5 will take time, that is, increasing the output torque of the engine will take time, and the problem will arise that good acceleration will not be able to be obtained regardless of whether rapid acceleration is required.

Therefore, in the present invention, when rapid acceleration is requested, to obtain good acceleration, the action of advancing the closing timing of the intake valve 7 is started before the target intake air amount GAt rises to the control limit intake air amount $GL_1$. Next, this fact will be explained with reference to FIG. 13.

Figure 13:
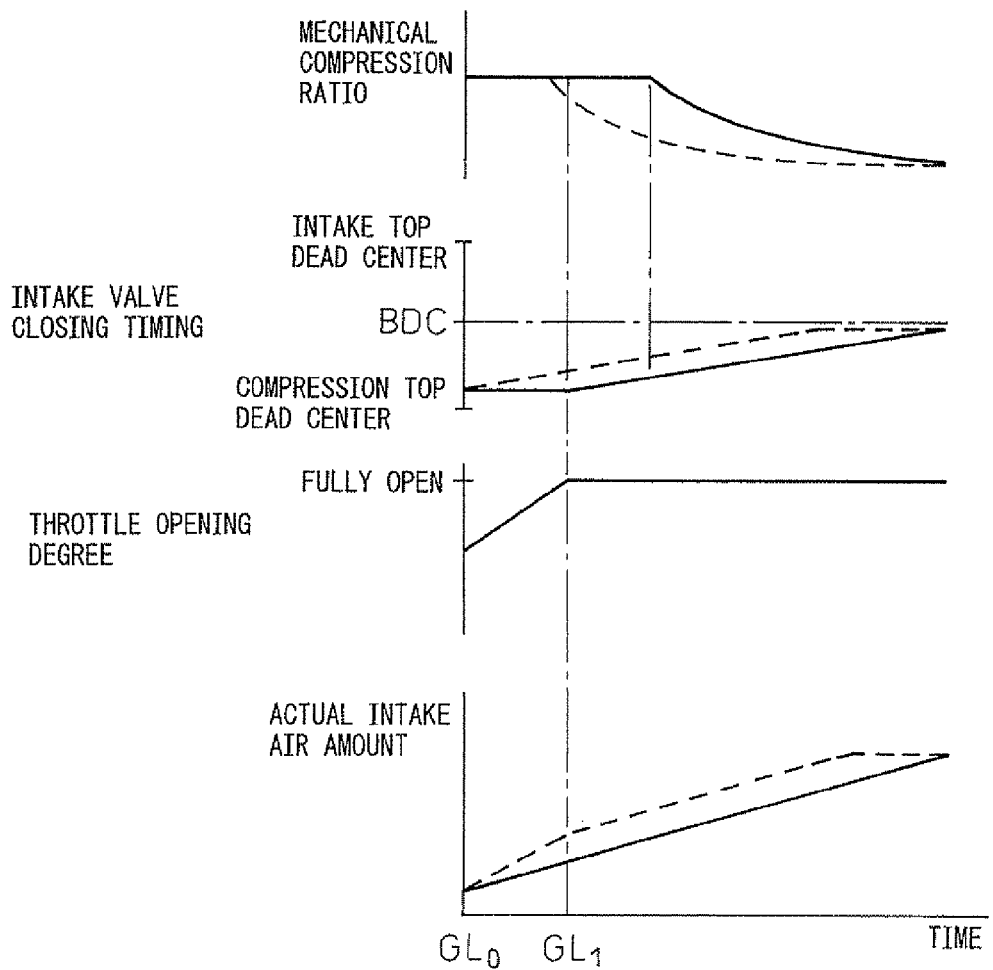
FIG. 13 is a view showing the changes along with time of the mechanical compression ratio etc. at the time of acceleration.

FIG. 13 shows the changes along with time in the mechanical compression ratio, the closing timing of the intake valve 7, the opening degree of the throttle valve 17, and the amount of intake air actually supplied into the combustion chamber 5 when a rapid acceleration operation is performed and the target intake air amount GAt changes as shown by $GAt_1$ in FIG. 12. Note that, in FIG. 13, the solid lines show the case where the mechanical compression ratio, the closing timing of the intake valve 7, and the opening degree of the throttle valve 17 are controlled in accordance with the relationship shown in FIG. 10 in accordance with the change in the target intake air amount GAt such as when the required acceleration degree is low. In this case, the actual amount of intake air supplied in the combustion chamber 5 is gradually increased as shown in FIG. 13.

As opposed to this, in the embodiment according to the present invention, as shown by the broken line in FIG. 13, if acceleration is started, the action of advancing the closing timing of the intake valve 7 is immediately started. If immediately starting the action of advancing the closing timing of the intake valve 7 when acceleration is started in this way, the amount of intake air actually supplied into the combustion chamber 5 rises by a faster speed as shown by the broken line compared with the case shown by the solid line. Therefore, the engine output torque rapidly rises and as a result a good acceleration operation is obtained.

That is, expressing this generally, in the embodiment according to the present invention, when an acceleration operation is performed when the amount of intake air supplied to the combustion chamber 5 is smaller than the control limit intake air amount $GL_1$, if the required acceleration degree is higher than a predetermined degree, movement of the closing timing of the intake valve 7 from the limit closing timing in the direction approaching the intake bottom dead center is immediately started. When the required acceleration degree is lower than the predetermined degree, the closing timing of the intake valve 7 is held at the limit closing timing until the amount of intake air supplied into the combustion chamber 5 reaches the control limit intake air amount $GL_1$. After the amount of intake air supplied to the combustion chamber 5 reaches the control limit intake air amount $GL_1$, movement of the closing timing of the intake valve 7 from the limit closing timing in the direction approaching the intake bottom dead center is started.

Note that, in this way, the action of advancing the closing timing of the intake valve 7 is preferably performed immediately when acceleration is started, but it is also possible to delay the timing of start of the action of advancing the closing timing of the intake valve 7 somewhat from the time of start of acceleration. Therefore, if expressing the present invention comprehensively including this case as well, in the present invention, when an acceleration operation is performed when the amount of intake air supplied to the combustion chamber 5 is smaller than the control limit intake air amount $GL_1$, if the required acceleration degree is higher than a predetermined degree, movement of the closing timing of the intake valve 7 from the limit closing timing in the direction approaching the intake bottom dead center is started when the amount of intake air supplied to the combustion chamber 5 is smaller compared with when the required acceleration degree is lower than the predetermined degree.

Note that, in the embodiment according to the present invention, if an acceleration operation is performed when the amount of intake air supplied to the combustion chamber 5 is smaller than the control limit intake air amount $GL_1$, regardless of whether the required acceleration degree is higher or lower than the predetermined degree, the action of increasing the opening degree of the throttle valve 17 is immediately started.

If including the operation of this throttle valve 17 as well, in the embodiment according to the present invention, when an acceleration operation is performed when the amount of intake air supplied to the combustion chamber 5 is smaller than the control limit intake air amount $GL_1$, if the required acceleration degree is higher than a predetermined degree, the action of increasing the throttle opening degree is started and movement of the closing timing of the intake valve 7 from the limit closing timing in the direction approaching the intake bottom dead center is started immediately. When the required acceleration degree is lower than the predetermined degree, the action of increasing the throttle opening degree is immediately started and, after the throttle valve opening degree becomes the maximum, movement of the closing timing of the intake valve 7 from the limit closing timing in the direction approaching the intake bottom dead center is started.

Further, even when trying to start the action for advancing the closing timing of the intake valve 7 immediately when acceleration is started, the relationship between the closing timing of the intake valve 7 and mechanical compression ratio shown in FIG. 10 is maintained as it is. Therefore, as shown by the broken line in FIG. 13, if the starting timing of the action for advancing the closing timing of the intake valve 7 is advanced, the timing at which the mechanical compression ratio starts to fall from the maximum mechanical compression ratio is also advanced.

On the other hand, in the embodiment according to the present invention, the closing timing of the intake valve 7 and the mechanical compression ratio for when the starting timing of the action advancing the closing timing of the intake valve 7 are found from the relationship shown in FIG. 10. That is, assuming that the target intake air amount GAt at the time of start of the acceleration operation is $GL_0$, if the apparent target intake air amount GAt is increased from $GL_1$, at this time, and if using this apparent target intake air amount GAt to find the closing timing of the intake valve 7 and the mechanical compression ratio from the relationship shown in FIG. 10, it is possible to start the action for advancing the closing timing of the intake valve 7 immediately at the time of an acceleration operation. Therefore, in the embodiment according to the present invention, as the apparent target intake air amount GAt used for finding the mechanical compression ratio and the closing timing of the intake valve 7 based on FIG. 10, a value obtained by adding the target intake air amount GAt at that time to the correction value KGA, which is a difference between the target intake air amount $GL_0$ at the time of start of acceleration and the control limit intake air amount $GL_1$, is used.

As opposed to this, the opening degree of the throttle valve 17 is controlled from the relationship shown in FIG. 10 based on the target intake air amount GAt at that time.

Figure 14:
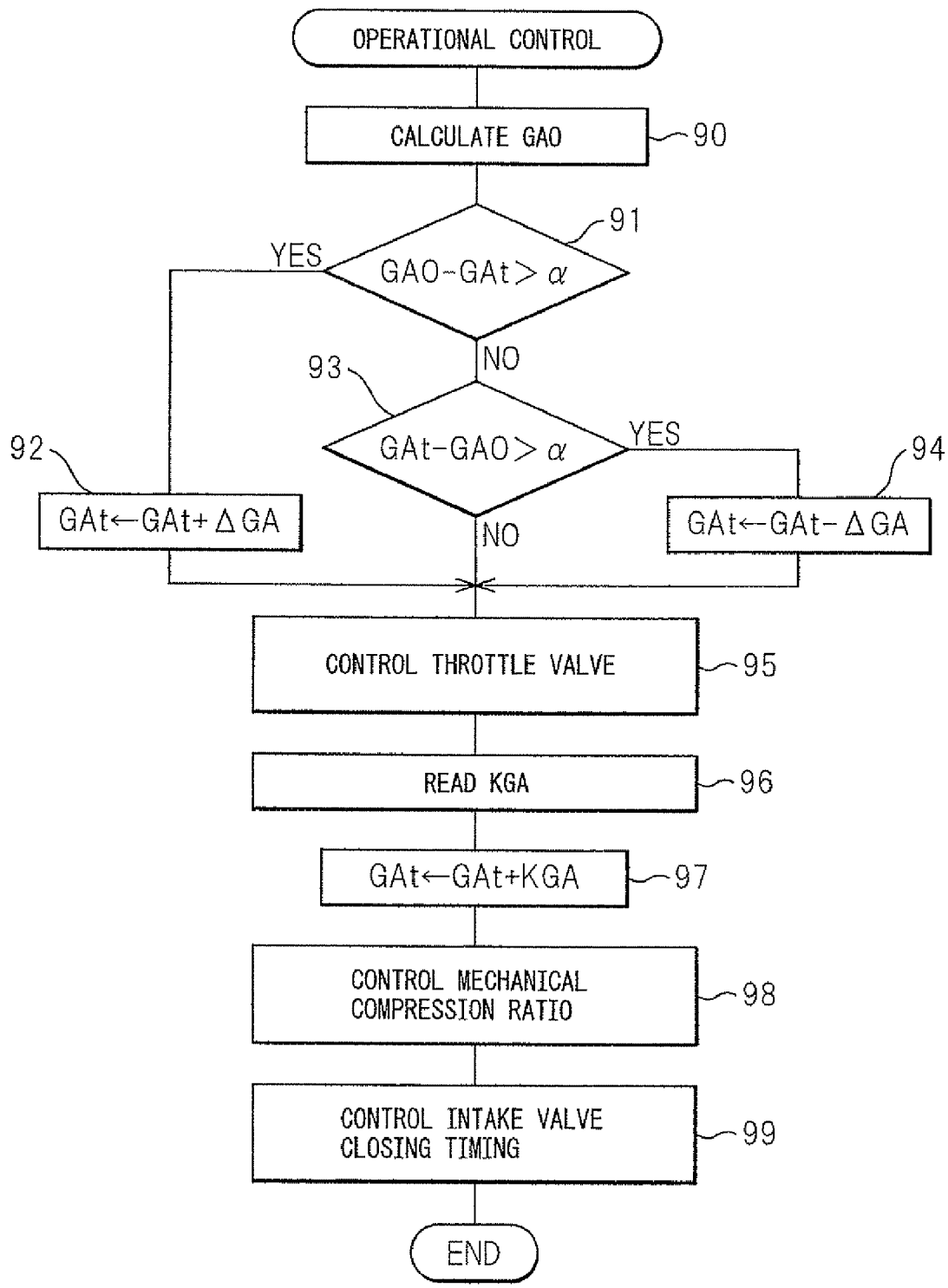
FIG. 14 is a flowchart for operational control.
Figure 15:
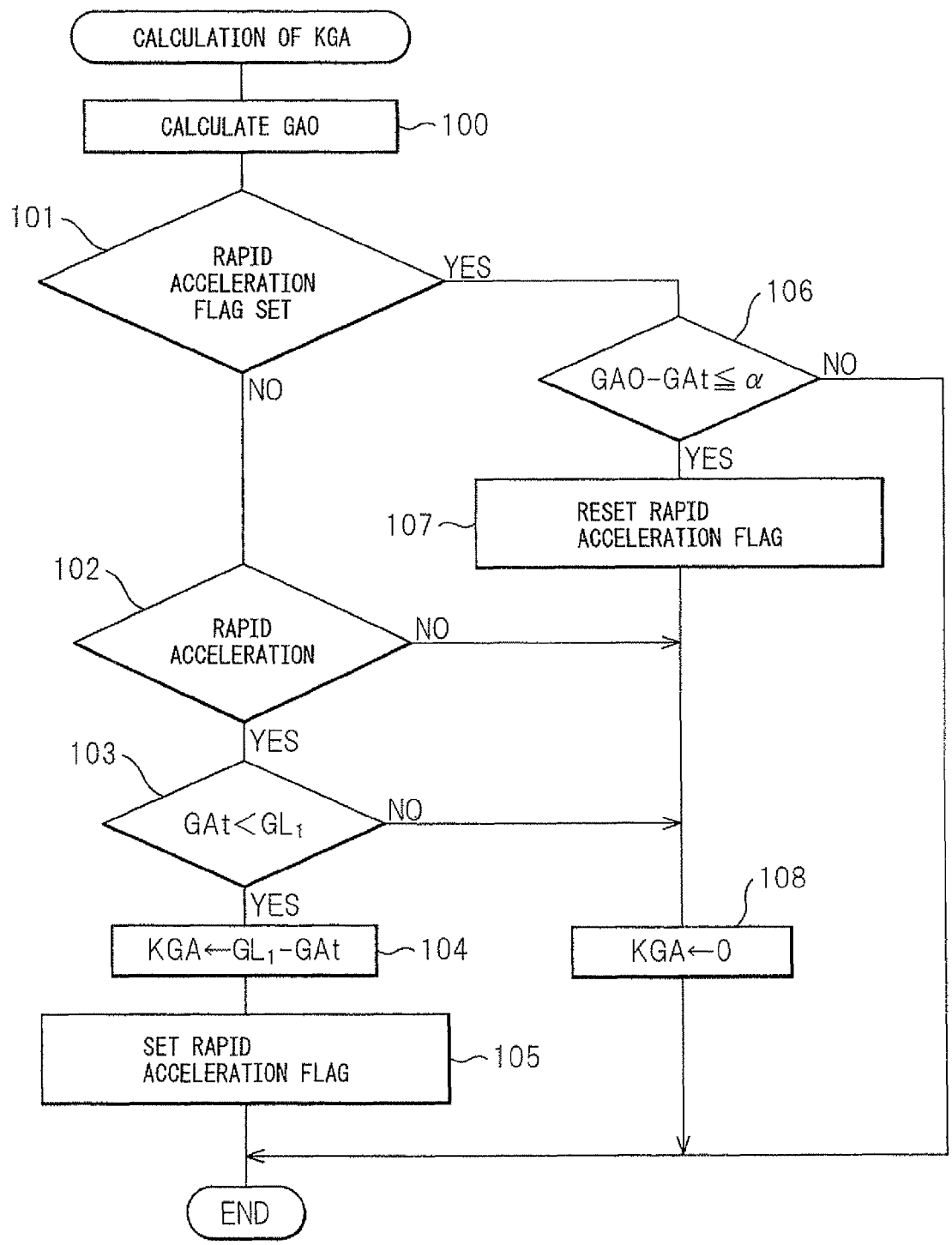
FIG. 15 is a flowchart for calculating the correction value KGA.

FIG. 14 shows the operational control routine for controlling the operation of the engine, while FIG. 15 shows the routine for finding a correction value KGA which is a difference between the target intake air amount $GL_0$ and the control limit intake air amount $GL_1$ at the time of start of acceleration. These routines are executed by interruption every constant time interval.

Referring to FIG. 14, first, at step 90, the required intake air amount GAO is calculated from the map shown in FIG. 11. Next, at step 91, it is judged if the required intake air amount GAO is larger than the current target intake air amount GAt by a predetermined small constant value α or more. When GAO−GAt>α, the routine proceeds to step 92 where a predetermined constant value ΔGA is added to the target intake air amount GAt. Next, the routine proceeds to step 95. Therefore, for example, as shown at $GAO_1$ in FIG. 12, when the required intake air amount GAO is rapidly increased, so long as GAO−GAt>α, as shown at $GAt_1$, the target intake air amount GAt is increased every certain time interval by a constant value ΔGA each.

On the other hand, when it is judged at step 91 that GAO−GAt≦α, the routine proceeds to step 93 where it is judged if the required intake air amount GAO is smaller than the current target intake air amount GAt by a constant value α or more. When GAt−GAO>α, the routine proceeds to step 94 where the target air-fuel ratio GAt is reduced by the constant value ΔGA, next, the routine proceeds to step 95. As opposed to this, when it is judged at step 93 that GAt−GAO≦α, that is, when GAt−α≦GAO≦GAt+α, the routine proceeds to step 95 without changing the target intake air amount GAt. That is, as shown by $GAO_2$ in FIG. 12, when the acceleration degree is low, even if it is judged at step 91 that GAO−GAt>α, it is judged for several processing cycles that at step 91, GAO−GAt≦α, so the target intake air amount GAt changes tracking the required intake air amount GAt.

At step 95, from the relationship shown in FIG. 10, the opening degree of the throttle valve 17 is controlled based on the target intake air amount GAt. Next, at step 96, the correction value KGA calculated in the routine shown in FIG. 15 is read, next, at step 97, this correction value KGA is added to the target intake air amount GAt. This correction value KGA is made zero other than at the time of rapid acceleration operation when the target intake air amount GAt is lower than the control limit intake air amount $GL_1$. Next, at step 98, from the relationship shown in FIG. 10, the mechanical compression ratio is controlled based on the target intake air amount GAt calculated at step 97, next, at step 99, from the relationship shown in FIG. 10, the closing timing of the intake valve 7 is controlled based on the target intake air amount GAt calculated at step 97.

Next, the routine for calculation of the correction value KGA shown in FIG. 15 will be explained.

Referring to FIG. 15, first, at step 100, the required intake air amount GAO is calculated from the map shown in FIG. 11. Next, at step 101, it is judged if the rapid acceleration flag set at the time of rapid acceleration has been set. When the rapid acceleration flag is not set, the routine proceeds to step 102 where it is judged if it is the time of rapid acceleration.

In this case, when the required acceleration degree is higher than the predetermined degree, it is judged that it is the time of rapid acceleration. Note that, in this case, as the amount representing the acceleration degree, for example, it is possible to use the amount of increase or speed of change of the required intake air amount GAO. For example, when the amount of increase of the required intake air amount GAO is a set amount or more and the speed of change of the required intake air amount GAO is a set speed or more, it is judged that it is the time of rapid acceleration. When not the time of the rapid acceleration, the routine proceeds to step 108 where the correction value KGA is made zero.

As opposed to this, when it is judged at step 102 that it is the time of rapid acceleration, the routine proceeds to step 103 where it is judged if the current target intake air amount GAt calculated at the routine shown in FIG. 14 is smaller than the control limit intake air amount $GL_1$. When $GAt \geq GL_1$, the routine proceeds to step 108 where correction value KGA is made zero. As opposed to this, when it is judged at step 103 that $GAt<GL_1$, the routine proceeds to step 104 where the value $(GL_1-GAt)$ obtained by subtracting the current target intake air amount GAt from the control limit intake air amount $GL_1$ is made the correction value KGA. Next, the routine proceeds to step 105 where the rapid acceleration flag is set.

When the rapid acceleration flag is set, at the next processing cycle, the routine proceeds from step 101 to step 106 where it is judged if the difference (GAO−GAt) between the required intake air amount GAO and the target intake air amount GAt becomes a constant value a or less. When GAO−GAt≦α, the routine proceeds to step 107 where the rapid acceleration flag is reset. Next, the routine proceeds to step 108 where the correction value KGA is made zero. That is, when $GAt<GL_1$, if rapid acceleration is performed, the correction value KGA is calculated. The thus calculated correction value is maintained until the target intake air amount GAt approaches the required intake air amount GAO.

Reference Signs List
1 crank case
2 cylinder block
3 cylinder head
4 piston
5 combustion chamber
7 intake valve
17 throttle valve
70 camshaft for driving intake valve
A variable compression ratio mechanism
B variable valve timing mechanism

The invention claimed is:

1. A spark ignition type internal combustion engine provided with a variable compression ratio mechanism able to change a mechanical compression ratio and a variable valve timing mechanism able to control a closing timing of an intake valve, wherein an amount of intake air supplied to a combustion chamber is mainly controlled by changing the closing timing of the intake valve, the mechanical compression ratio is increased toward a maximum mechanical compression ratio as the amount of intake air supplied to the combustion chamber is reduced, the amount of intake air supplied to the combustion chamber is reduced as the closing timing of the intake valve is moved in a direction away from an intake bottom dead center toward a limit closing timing, and, when the closing timing of the intake valve reaches the limit closing timing, the amount of intake air supplied to the combustion chamber becomes a control limit intake air amount which is a control limit by the variable valve mechanism, and when the amount of intake air supplied to the combustion chamber is further reduced from the control limit intake air amount, the closing timing of the intake valve is held at the limit closing timing, wherein, when an acceleration operation is performed when the amount of intake air supplied to the combustion chamber is smaller than the control limit intake air amount, if the required acceleration degree is higher than a predetermined degree, the movement of the closing timing of the intake valve from the limit closing timing in a direction approaching the intake bottom dead center is started when the amount of intake air supplied to the combustion chamber is smaller compared with when the required acceleration degree is lower than the predetermined degree.

2. A spark ignition type internal combustion engine as claimed in claim 1, wherein when an acceleration operation is performed when the amount of intake air supplied to the combustion chamber is smaller than the control limit intake air amount, if the required acceleration degree is higher than the predetermined degree, movement of the closing timing of the intake valve from the limit closing timing in a direction approaching the intake bottom dead center is immediately started and, if the required acceleration degree is lower than the predetermined degree, until the amount of intake air supplied to the combustion chamber reaches the control limit intake air amount, the closing timing of the intake valve is held at the limit closing timing, and, after the amount of intake air supplied to the combustion chamber reaches the control limit intake air amount, movement of the closing timing of the intake valve from the limit closing timing in a direction approaching the intake bottom dead center is started.

3. A spark ignition type internal combustion engine as claimed in claim 1, wherein a throttle valve is arranged in an engine intake passage and when the amount of intake air supplied to the combustion chamber is smaller than the control limit intake air amount, the amount of intake air supplied to the combustion chamber is controlled by the throttle valve.

4. A spark ignition type internal combustion engine as claimed in claim 3, wherein when an acceleration operation is performed when the amount of intake air supplied to the combustion chamber is smaller than the control limit intake air amount, if the required acceleration degree is higher than the predetermined degree, the action of increasing a throttle opening degree is started and movement of the closing timing of the intake valve from the limit closing timing in a direction approaching the intake bottom dead center is started immediately and, if the required acceleration degree is lower than the predetermined degree, the action of increasing the throttle opening degree is immediately started and, after the throttle valve opening degree becomes maximum, movement of the closing timing of the intake valve from the limit closing timing in a direction approaching the intake bottom dead center is started.

* * * * *